United States Patent [19]

Braid

[11] Patent Number: 4,817,323
[45] Date of Patent: Apr. 4, 1989

[54] BELT FOR USE WITH A FISHING ROD

[76] Inventor: Dennis Braid, 8046 Oso Ave., Canoga Park, Calif. 91306

[21] Appl. No.: 29,085

[22] Filed: Mar. 23, 1987

[51] Int. Cl.$^4$ ............................................. A01K 97/10
[52] U.S. Cl. ..................................................... 43/21.2
[58] Field of Search ................. 43/21.2; 224/163, 922, 224/226, 195, 200

[56] References Cited

U.S. PATENT DOCUMENTS

| 187,651 | 4/1860 | Hiering | 43/21.2 |
| 193,166 | 7/1862 | Hengst | 43/21.2 |
| 2,576,624 | 11/1951 | Miller | 43/21.2 |
| 2,719,659 | 10/1955 | Bowman | 43/21.2 |
| 2,735,596 | 2/1956 | Smedley et al. | 43/21.2 |
| 4,081,115 | 3/1978 | White et al. | 43/21.2 |
| 4,297,807 | 11/1981 | Normann | 43/21.2 |

FOREIGN PATENT DOCUMENTS

| 1601116 | 10/1981 | United Kingdom | 43/21.2 |
| 2119612 | 10/1983 | United Kingdom | 43/21.2 |

Primary Examiner—Nicholas P. Godici
Assistant Examiner—Karen Skillman

[57] ABSTRACT

A device for holding a fishing rod is set forth which includes a rigid fixture contoured to rest on the upper thighs of the fisherman. The fixture has a forward facing surface with a V-shaped rib the apex of which coincides with a bore adapted to receive the end of a fishing rod to guide the rod into the bore. To hold the fixture a belt extends angularly upward from each end of the fixture around the waist and back of the fisherman.

4 Claims, 3 Drawing Sheets

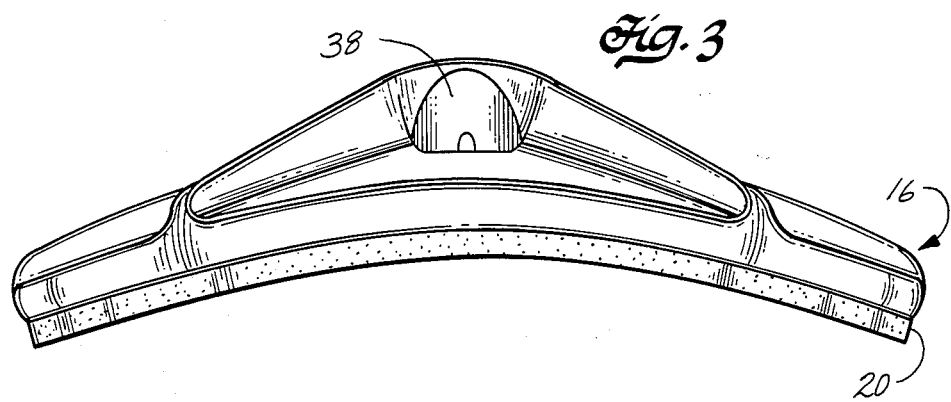
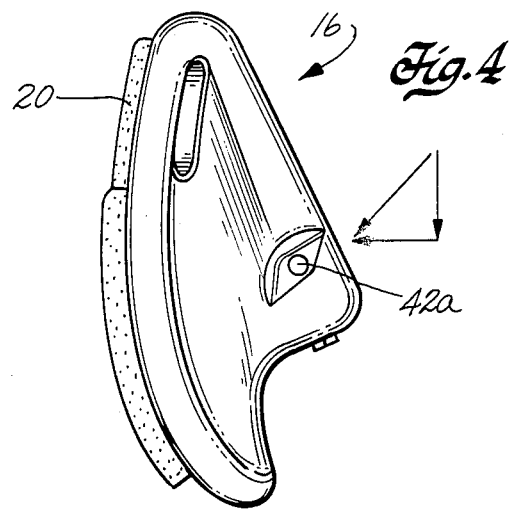

4,817,323

BELT FOR USE WITH A FISHING ROD

FIELD OF THE INVENTION

This invention relates to fishing apparatus, and more particularly to devices for holding a fishing rod to the person while angling and fighting a fish.

BACKGROUND OF THE INVENTION

Certain types of fishing such as surf or deep sea fishing requires the use of large tackle including the rod and reel. Holding the rod in an angling position, i.e., with the tip of the rod up in expectation of a strike by a fish, can be tiresome. When a fish, particularly a large fish, is hooked, the rod is often vigorously pumped forwardly and backwardly in conjunction with retrieving line with the reel. Hence, the fisherman must exert strength to not only hold the rod and reel but also to bring in the fish.

When fishing from a boat a chair is often used which includes a bracket to hold the rod. The chair is pivotally mounted to the deck of the boat. In situations where a chair is not available, or where the angler is surf fishing, it has been known to provide a harness arrangement including a pouch, usually leather, to hold the end of the rod. The rod is positioned in the pouch when the rod is in the angling position with the harness transferring the weight from the tackle to the angler's hips, back and/or shoulders. To aid in holding the rod sometimes additional harness means are provided which attach to the rod remote from the pouch. These harness means transfer horizontal components of forces, i.e., the weight of the tackle and fish, that are directed away from the person to the back and shoulders. While the pouch and other harness means transfer certain vertical and horizontal forces to the body, these devices do not effectively and comfortably transfer the horizontal component forces directed toward the fisherman to the fisherman's body. For example, while playing a fish, the rod is pumped by pulling the rod toward the body. This activity produces horizontal forces in the direction of the angler with the pouch acting as a fulcrum.

SUMMARY OF THE INVENTION

There is, therefore, set forth according to the present invention a device for holding a fishing rod wherein the angling position which comfortably and efficiently transfers vertical and horizontal loads to the fisherman's body.

Toward this end, the device includes a rigid fixture substantially symmetrical about an imaginary vertical center line, the fixture including a forward surface having a bore to receive the end of the rod and a V-shaped ridge having a crotch at the bore to guide the insertion of the rod end therein. Opposite the forward surface, the fixture has a rear surface adapted to lay against the fisherman's upper thighs to transfer horizontal components acting on the fishing rod to the fisherman. At each end, the fixture further includes a slot angled upwardly at an acute angle with respect to the imaginary center of the line with a belt adapted to be at one end attached through one slot, wrapped over the hips and around the lower back and to be adjustably attached to the other end of the fixture through the other slot. The angled slots cooperate with the belt to position the fixture at the appropriate location of the upper thighs.

During angling, the end of the rod is received in the bore with the V-shaped ridge providing a guide for the end of the rod into said bore. With the end of the rod nesting in the bore, the angler can hold the rod in the angling position with the horizontal components of forces at the end of the rod being transmitted through the device into the angler's thighs and the vertical components of forces being transferred through the belt to the angler's hips and lower back. In this fashion, it is believed that even heavy deep sea fishing equipment can comfortably be held for extended period of time.

To prevent the rod from twisting within the bore, a pin may be provided through the bore which registers within an appropriate groove at the end of the rod for this purpose.

Further, to enhance the comfort of the device, a layer of resilient cushioning material may be disposed over the rear surface of the device.

BRIEF DESCRIPTION OF THE DRAWINGS

These and other features and advantages of the present invention will become appreciated as the same becomes better understood with respect to the specification, claims and drawings wherein:

FIG. 3 is a top view of the device according to the present invention; and

FIG. 4 is a side view of the device according to the present invention.

DETAILED DESCRIPTION

Figure 1:
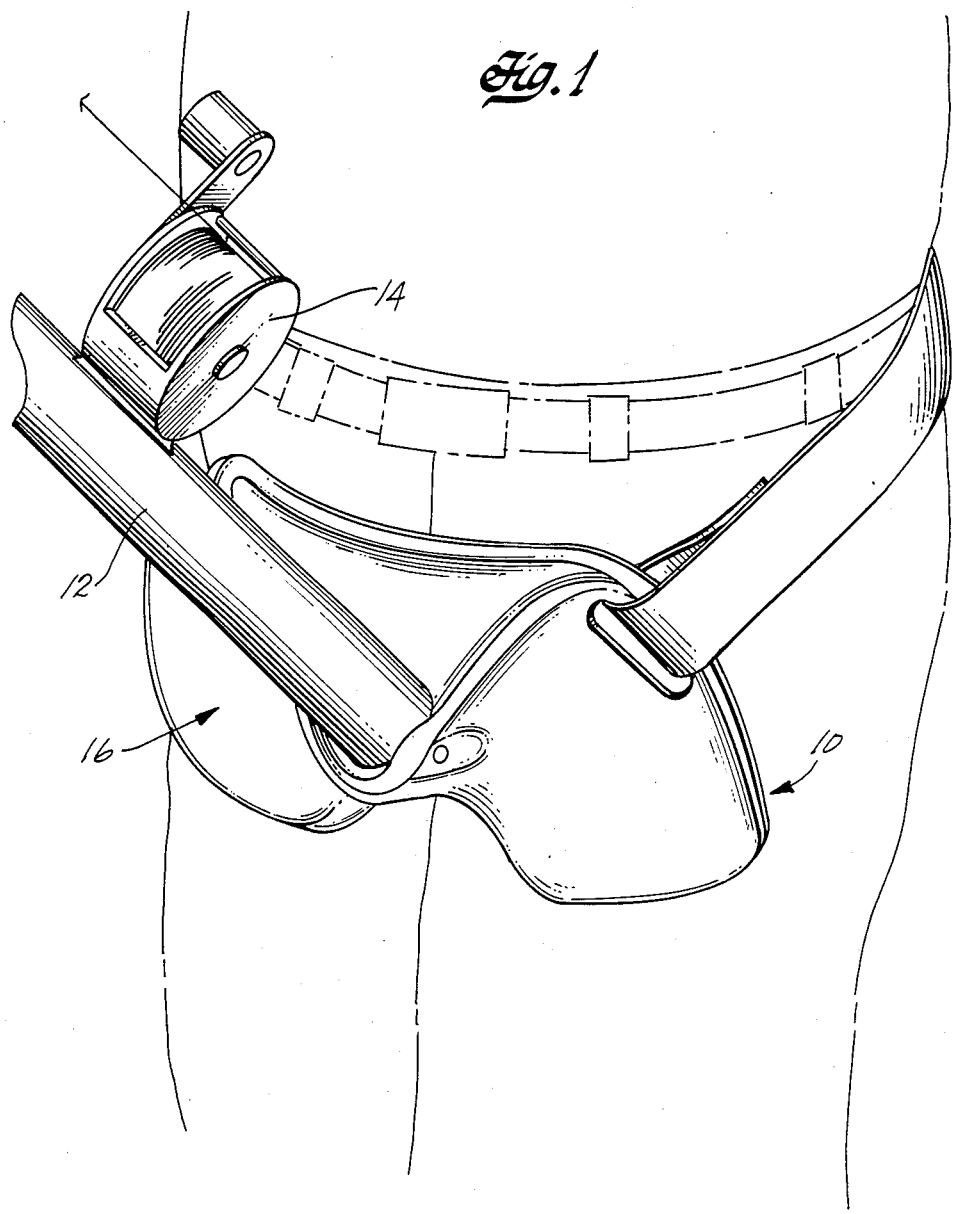
FIG. 1 is a perspective view of the device as used by a fisherman.

Turning to the drawings, FIG. 1 shows a device 10 adapted to hold fishing apparatus defined by a rod 12 and fishing reel 14. When fishing with large tackle, it is often necessary to hold the rod 12 and reel 14 for extended periods of time. This equipment tends to be heavy and may quickly exhaust the fisherman. In addition to the weight of the equipment, forces pulling at the line such as the current or when playing a fish, may further increase the resistance required by the fisherman to hold the rod 12 the reel 14 further exhausting the fisherman. Therefore, the device 10 according to the present invention is adapted to receive the rod 12 and to transfer the vertical and horizontal loads imposed upon the fishing gear to the body of the fisherman enabling the fisherman to enjoy the sport for extended periods of time.

Figure 2:
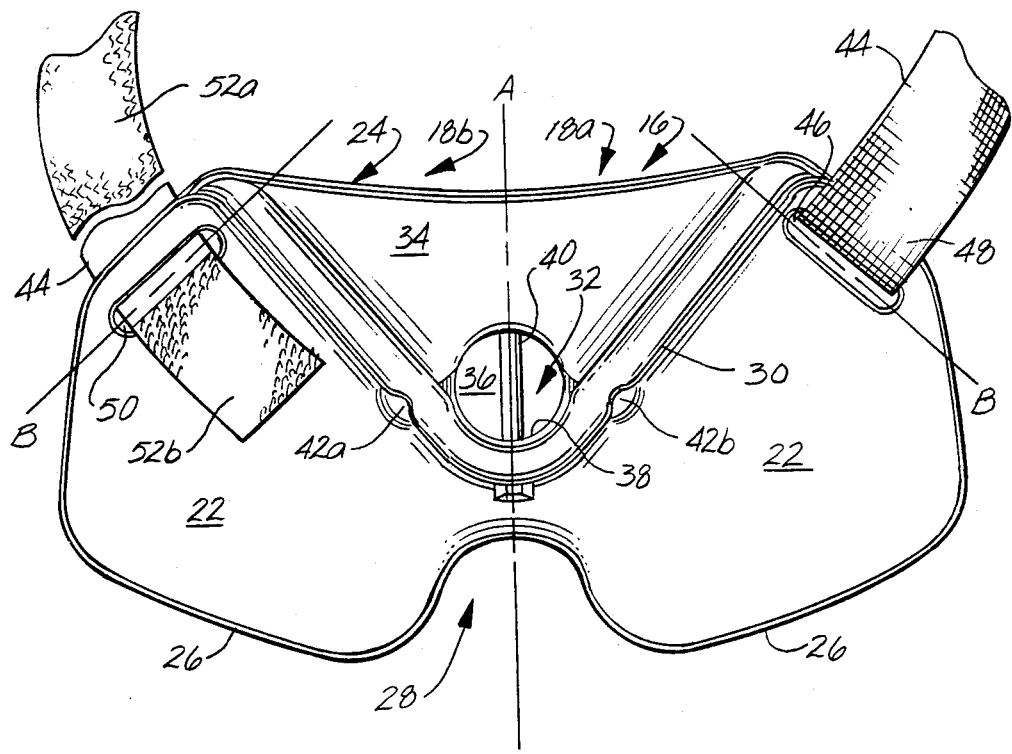
FIG. 2 is a front view of the device according to the present invention.

With reference to FIGS. 2-4, the device 10 includes a rigid fixture 16 made for example from a plastic material which is symmetrical about a vertical center axis A dividing the fixture 16 into symmetrical portions 18a and 18b as best shown in FIG. 2. In top plan view (FIG. 3), it is seen that the fixture 16 is arcuate to mate with the contour of the upper thighs of an individual and is also in side view (FIG. 4) somewhat concave likewise for this purpose. The aforesaid two dimensional curvature of the fixture 16 enables it to neatly rest against the upper thighs of the fisherman's legs. As illustrated in FIG. 1, when the device 10 is worn by the fisherman, the fixture 16 rests against the upper thighs below the waistline so as to transfer the horizontal components of loading upon the rod 12 to the upper thighs.

To cushion the fixture 16, the rear or inside surface may be provided with a layer 20 of cushioning material such as foam rubber or the like.

With specific reference to FIG. 2, it is seen that each of the portions 18a, 18b of the fixture 16 includes a somewhat canted rectangular panel 22 which when the device 10 is positioned overlays the upper thighs. The panels 22 merge at the center axis A finding a curved upper margin 24 for the fixture 16 which extends somewhat parallel to the fisherman's waistline. Opposite the upper margin 24, the panels 22 define a downwardly curved lower margin 26. In that when the fisherman wears the device 10, he/she will stand with the legs apart, the lower margin 26 includes an upwardly directed curved notch 28 symmetrical about the center axis A. The material removed to define the notch 26 minimizes the overall weight for the fixture 16.

As can be appreciated by providing the somewhat rectangular panels 22, the surface area of contact between the fixture 16 and upper thighs of the fisherman is maximized. The panels 22 are configured and arranged to follow the contour of the upper thighs as the fisherman stands with the legs slightly apart. In this manner, horizontal forces acting upon the fixture 16 are efficiently transferred to the fisherman's legs over a large area minimizing discomfort.

To receive the rod 12, the forward face of the fixture 16 includes a V-shaped rib 30 which extends from the upper margin 24 gradually to forwardly define a crotch 32 the purposes of which will hereinafter become evident. As shown in the drawings, the forward surface of the fixture 16 is contoured to smoothly project forwardly to define the rib 30. Within the bounds of the rib 30 and upper margin 24 is defined a guide surface 34. Guide surface 34 thickens the fixture 16 from the upper margin 24 to the crotch 32 adding structural rigidity to the fixture 16 and to the area surrounding the crotch 32. Opposite the guide surface 34, the forward face of the fixture 16 curves inwarly to define the panels 22 of substantially uniform thickness.

To receive the rod 12, the fixture 16 includes at the crotch 32 a bore 36 having a diameter to closely receive the end of the rod 12 and being somewhat inclined in a direction from the rear to the forward surface of the fixture to accommodate the rod 12 when it is held in the angling position as shown in FIG. 1. In this position, the rod 12 is held angled away from the body of the fisherman to keep its tip (not shown) up in anticipation of a strike. The rib 30 is configured at the crotch 32 to follow the outside diameter of the bore 36 defining an arcuate lowermost supporting trough 38 (FIGS. 2 and 3).

To position the rod 12 in the fixture 16, the fisherman brings in the end of the rod 12 into engagement with the guide surface 34. Without looking the rod 12 is moved as guided by the guide surface 34 and rib 30 into registry with the bore 36. When received into the bore 36, the rod rests against the bounds of the bore 36 and the trough 38. By virtue of the trough 38, the vertical component of loading upon the rod 12 such as the weight of a fishing tackle and other forces are transferred from the rod 12 to the trough 38 and fixture 16.

To provide a stop for the insertion of the rod 12 into the bore 32, and to transfer the horizontal components of loading upon the rod 12 to the fixture 16, a pin 40 is provided which passes through the bore 32 and which is received by a corresponding groove (not shown) fashioned in the bottom of the rod 12. By virtue of this arrangement, the horizontal components of loading upon the rod 12 such as the force necessary to hold the rod 12 in the upright position to play a fish are transferred from the rod 12 through the vertical pin 40 and to the fixture 16. The pin 40 and cooperating groove on the rod 12 also prevent the rod 12 from twisting within the bore 32.

In that some rods 12 have a horizontal groove as opposed to a vertical groove, the fixture 16 can be provided with holes 42a, 42b to accommodate a horizontal pin.

To hold the fixture 16 to the body of the fisherman, a belt 44 is provided. The belt is adapted to be connected to one portion of the fixture 16, extend around and over the hips of the fisherman and become attached to the other portion. With reference to FIGS. 1 and 2 for this purpose, portion 18a includes at its panel 22 an elongated first opening 46 has a longitudinal axis B which makes an acute angle with respect to the center axis A. This angle may be about 45°. The belt 44 at its end 48 is permanently attached to the portion 18a through the first opening 46 as by stitching or the like.

The opposite portion 18b is provided with a second opening 50 also having a longitudinal axis B arranged at the same acute angle with the center axis A. The belt 44 can be passed through the second opening 50 and secured as by providing velcro-type surfaces 52a and 52b to attach the fixture 16 to the body of the fisherman.

As shown in the drawings and described above, the first and second openings 46, 50 are arranged at acute angles with respect to the center axis A. Since the device 10 is designed to position the fixture against the upper thighs of the fisherman rather than at the pelvis, the arrangement of the first and second openings 46, 50 naturally achieves this result. As shown in FIG. 1, the angular arrangement of the openings divergingly directs the belt 44 to extend angularly upward from both of the portions 18a, 18b resulting in the belt, as shown in FIG. 1 extending from the fixture 16 over the hip bones and across the lower back of the fisherman. Hence, vertical loading on the fixture 16 is transferred through the belt 44 to the hip bones and lower back. Heretofore, devices have transmitted vertical loading to the lower back and shoulders. It is believed that by providing the belt 44 and the arrangement described above vertical loading is sufficiently transferred to the hips and lower back enhancing the comfort of the device 10.

While I have shown and described certain embodiments of the present invention, it is to be understood that it is subject to many modifications without departing from the spirit and scope of the claims set forth herein.

What is claimed is:

1. A device for holding a fishing rod to the body in an angling position comprising:

a rigid fixture substantially symmetrical about an imaginary center line, said fixture including a forward surface having an upper edge, a bore into which the end of a fishing rod may be inserted and a raised V-shaped ridge having a crotch at the bore and legs which extend upwardly and laterally outwardly from the bore to thereby form a guide surface between the legs of the V-shaped ridge that extends between the bore and the upper edge of the forward surface of the fixture for guiding a rod end into the bore, said fixture also having a rear surface adapted to lay against the body to assist in holding the rod when in the angling position and further including at each end a slot angled upwardly at an acute angle with respect to said center line; and a belt adapted at one end to be attached through one slot, wrap over the hips and around the lower back of the user and be adjustably attached at the other end through the other slot, said slots cooperating with the belt to position the fixture adjacent the body of the user.

2. The device of claim 1 wherein said slots are arranged at an acute angle with respect to said center line to divergingly direct the belt about the hips and lower back.

3. The device of claim 2 wherein said acute angle is about 45°.

4. A device for holding a fishing rod to the body in an angling position comprising:

a rigid fixture substantially symmetrical about an imaginary center line, said fixture including a forward surface having an upper edge, a bore into which the end of a fishing rod may be inserted and a raised V-shaped ridge having a crotch at the bore and legs which extend upwardly and laterally outwardly from the bore to about the upper edge of the fixture to thereby form a guide surface which extends between the legs of the V-shaped ridge and between the bore and the upper edge of the forward surface of the fixture for guiding a rod end into the bore, said fixture also having a rear surface adapted to lay against the body to assist in holding the rod when in the angling position and further including at each end a slot angled upwardly at an acute angle with respect to said center line; and a belt adapted at one end to be attached through one slot, wrap over the hips and around the lower back of the user and be adjustably attached at the other end through the other slot, said slots cooperating with the belt to position the fixture against the body of the user.

* * * * *